Feb. 12, 1935.  G. H. HORNE ET AL  1,990,943
MEANS FOR TREATING GASES
Filed Oct. 28, 1929   5 Sheets-Sheet 1

INVENTOR.
George H. Horne
Marcel A. Lissman.
BY
ATTORNEYS

Feb. 12, 1935.  G. H. HORNE ET AL  1,990,943
MEANS FOR TREATING GASES
Filed Oct. 28, 1929   5 Sheets-Sheet 3

INVENTOR.
George H. Horne.
Marcel A. Lissman.
BY Arthur P. Knight and
Alfred W. Knight
ATTORNEYS Feb. 12, 1935.   G. H. HORNE ET AL   1,990,943
MEANS FOR TREATING GASES
Filed Oct. 28, 1929   5 Sheets-Sheet 4

INVENTOR.
George H. Horne.
Marcel A. Lissman.
BY Arthur P. Knight and
Alfred W. Knight
ATTORNEYS Patented Feb. 12, 1935

1,990,943

UNITED STATES PATENT OFFICE 1,990,943

MEANS FOR TREATING GASES

George H. Horne, Glendale, and Marcel A. Lissman, Los Angeles, Calif., assignors to International Precipitation Company, Los Angeles, Calif., a corporation of California Application October 28, 1929, Serial No. 403,003

5 Claims. (Cl. 183—85)

This invention relates to means for treating gases or vapors for the purpose of removing suspended material therefrom and/or of transferring heat to or from such gases or vapors. More particularly the invention relates to apparatus for effecting such removal of suspended material and/or transfer of heat by means of cyclonic or vortical action in the gases or vapors being treated.

An important object of the invention is to provide an apparatus dependent on vortical action and adapted to effect an efficient separation and collection of suspended material of small particle sizes, and particularly particles which have heretofore been considered to be impossible of efficient collection in vortical or "cyclone" apparatus. A further object is to provide an apparatus of this type which may be made to handle any desired gas volume and to effect a higher degree of removal of suspended material therefrom than has been obtainable in vortical or "cyclone" apparatus heretofore used.

A further object of the invention is to provide an apparatus which is simpler and more economical in construction and operation than other forms of apparatus heretofore used for the separation of finely divided suspended material from gases.

A further object of the invention is to provide an apparatus which, in an installation of relatively small size and cost, is adapted to effect a relatively high heat transfer to or from a body of gases. A particular object in this connection is to provide an apparatus which is highly efficient both as a means of separation of suspended material and as a means of heat transfer, so that a single apparatus may be used to clean the gases while simultaneously cooling or heating the same.

Vortical or cyclone separators now in use for the removal of suspended material from gases are so designed that the vortical cyclonic action occurs substantially only in the upper portion of the separating chamber while the lower portion of such chamber constitutes a relatively quiescent zone or dead air space. The suspended material separated from the gas stream by centrifugal force in the upper part of the chamber falls by gravity down along the walls of the chamber, into this dead air space, and the usual object sought in the design of such apparatus is to prevent the suction of the axial vortex from reaching into this dead air space and carrying away portions of the collected material through the central outlet at the top of the apparatus. This object is usually accomplished either by the relative dimensions of the apparatus compared to the volume of gas to be treated or by various baffling arrangements. All of these separators, however, have the following aim in common:— They endeavor to let the dust, which is thrown out against the wall of the chamber by radial acceleration, fall into a dead air space, and to prevent the axial vortex of the separator from penetrating into this dead air space. It has been shown that for particles below 10 microns average diameter, such as are frequently carried in suspension by industrial gases, the force of gravity is entirely inadequate to cause the particles to fall into such a dead air space at a sufficient rate for practical operation. The dimensions of the apparatus required so that particles of such small size can fall by gravity, and the very low residual velocities required in the "dead air" space in order to permit such particles to settle by gravity, make the size and cost of separators of the present type prohibitive for use on such small particles. It may, therefore, be conservatively stated that vortical or cyclone separators of the type above described cannot successfully collect particles below 10 microns average diameter.

An important feature of our invention is the utilization of forces several times greater than the force of gravity to insure downward movement of the particles after they have been thrown radially out of the gas stream and to carry them downwardly out of contact with the rapidly whirling gases and into a relatively quiescent space where they may be collected. The force which is utilized for this purpose in our apparatus is derived from energy supplied to the gas itself.

The accompanying drawings illustrate embodiments of our invention and referring thereto.

Figures 1, 2, 3, 7:
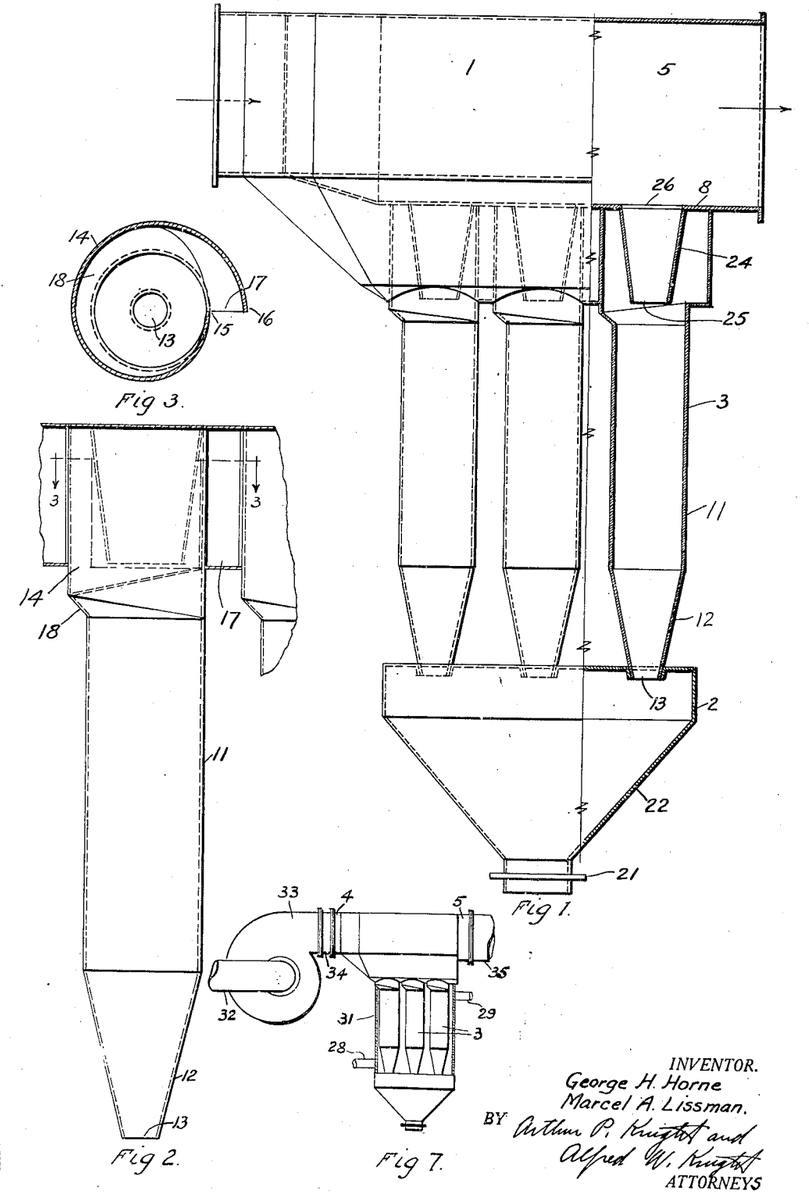
Fig. 1 is a partly sectional side elevation of one form of vortical separating apparatus.
Fig. 2 is a partial section, showing one of the vortical elements in elevation.
Fig. 3 is a horizontal section of one of the separating elements, taken on line 3—3 in Fig. 2.
Fig. 7 is a side elevation of the form of separating apparatus shown in Figs. 1 to 5, provided with means for causing flow of gas therethrough, said figure also showing, in section, an enclosing casing for the vortical separating elements.
Figure 4:
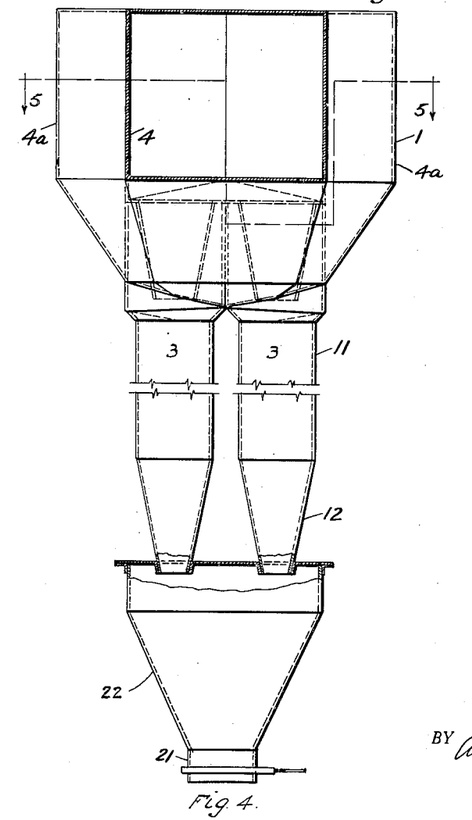
Fig. 4 is an end view of the apparatus, taken on line 4—4 in Fig. 5.
Figure 5:
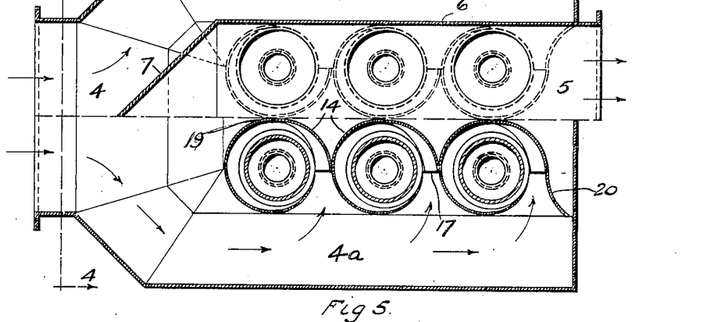
Fig. 5 is a horizontal section thereof on line 5—5 in Fig. 4.

Referring particularly to Figs. 1 to 5 inclusive, the apparatus is there shown as comprising common upper header means 1, a common material receptacle or settling chamber 2, and a plurality of vertically disposed vortical separating elements 3 connected between said upper header and said material receptacle. The upper header is so constructed as to provide an inlet flue 4 and an outlet flue 5, said inlet flue having two branches 4a leading therefrom and extending alongside of and partially beneath the outlet flue. The outlet flue 5 is completely separated from the inlet flue and the branches thereof, by means of side walls 6, end wall 7 and bottom plate 8. In some cases, where it is permissible to discharge the cleaned gas directly into the surrounding atmosphere, the outlet flue 5 may be omitted, and the outlet pipes from the several elements may open directly to the atmosphere. As shown in Figs. 1 and 5, the bottom of the various portions of the inlet flue and its two branches are sloped downwardly and inwardly toward the inlet openings of the separating elements so as to deflect toward said inlet openings any material settling thereon from the incoming gases.

As shown particularly in Figs. 2 and 3, each vortical separating element preferably comprises a cylindrical portion 11 of sufficient height to cause the gas to make several complete revolutions therein and provided at its upper end with suitable inlet means for admitting gas substantially tangentially and downwardly into said cylindrical portion and with a conical bottom portion 12 tapering gradually inwardly toward a restricted opening 13 at the bottom. The tangential inlet means is shown as comprising a curved deflector plate or wall 14 which is substantially tangential to the circumference of the cylindrical portion at 15 and which extends outwardly from this point in the form of a spiral whose outer end 16 is spaced from the inner end 15 so as to provide a gas inlet opening 17 therebetween. Said deflector plate is shown as extending through one complete revolution from its outer end 16 to its point of tangency 15 with the cylindrical portion, but this is not necessary to the invention, and curved deflector plates of any suitable length may be employed, provided they effect substantially tangential delivery of the gas into the cylindrical portion of the separating elements. The lower edge of the deflector plate 14 is connected to the upper edge of the cylindrical portion 11 by a suitably shaped shoulder 18. Considerable variation is permissible in the proportions and dimensions of the parts of these separating elements, but we have found that, for best results certain general rules should be adhered to, as will be more fully explained hereinafter. The outer ends 16 of the deflector plates are disposed in juxtaposition to the deflector plates of the adjacent elements, while the deflector plates of the elements as is shown in Fig. 5 in the two rows are also in close contact as at 19. Curved plates 20 extend from the deflector plates of the last elements to the end wall of the upper header, so as to complete the enclosure of the inlet flue branches 4a.

The constricted lower ends 12 of the several separating elements open into the common dust bin 2 which is shown as completely enclosed and provided with suitable means, such as a gate indicated at 21, for removal of collected material therefrom. The bottom 22 of said dust bin preferably slopes downwardly and inwardly toward said dust removal means.

Each separating element is also provided with a frusto-conical outlet pipe 24 whose axis coincides with that of the cylindrical portion 11, said outlet pipes being advantageously secured to the bottom plate 8 of the outlet flue and depending therefrom within and spaced from the spiral deflector 14. Said outlet pipes are of suitable height to prevent direct passage of the incoming gases into the interior of said outlet pipe and insure that said gases are first directed downwardly and tangentially into the vortical chambers of the separating elements. For example, we have shown the outlet pipes 24 as being vertically coextensive with the inlet openings 17, although the invention is not restricted to this exact relationship. Each of said outlet pipes is of smaller diameter at its lower end than at its upper end so that the opening 25 at the lower end thereof forms a restricted throat through which the gas must pass to reach the outlet flue. This throat is somewhat smaller in diameter than the cylindrical portion of the separating element and should preferably be so proportioned as to provide the most efficient relationship between the downward velocity of the gas through the ring-shaped space between this pipe and the outer wall, and the upward velocity of the ascending vortex through the throat. The respective outlet pipes 24 open at their upper ends through openings 26 into the outlet flue 5.

The vortical separating chamber of each element may be considered as extending from the top of the cylindrical portion 11 to the dust outlet 13 at the bottom, while the space between deflector plate 14 and outlet pipe 24 may be considered as an entrance chamber, although the vortical motion of the gas is of course initiated in this latter chamber. The maximum diameter of the vortical separating chamber, which is in this case the diameter of the cylindrical portion 11, should be sufficiently small to provide a high radial acceleration in the gas and also a relatively small thickness of gas stream. This diameter should preferably not exceed 12 inches, and for the separation of small sized particles we find it preferable to make this diameter between 4 and 9 inches. While the invention does not preclude the use of smaller sizes than this, the practical difficulties increase, due in part to necessity for greater accuracy of alignment of parts, and to the rapid increase in the number of elements required and the cost of manufacture thereof. The height of the vortical separating chamber should be several times as great as the largest internal diameter thereof, for example, between 3½ and 7 times the largest diameter thereof, and for best results we prefer to make this ratio of height to diameter between 4 and 5. Such relative height of the vortical chambers is necessary in order to cause the gas stream to undergo several complete revolutions in said chamber. This not only provides a sufficient length of path for the gas to afford the necessary time for the suspended particles to reach the outer boundary of the gas stream, but also permits a gradual passage of the gas from the external vortex to the internal vortex moving in the reverse linear direction.

This gradual inward movement of the gas is of advantage as it opposes a minimum resistance to the outward movement of the suspended particles. If this height is unduly decreased, the centrifugal force is given too short a time to act and the gas is given too great an inward component of motion due to the decrease in the area over which this inward movement may take place, while if this height is made too great it is difficult to maintain active vortical motion of the gas at the lower end.

The diameter of the gas outlet throat 25, that is, the minimum diameter of the outlet cone 24, should be from one-half to three-fourths the largest diameter of the vortical separating chamber, in order to provide the proper proportion between the ring-shaped space around the cone for downward passage of the gas into the vortical chamber and the size of the throat for upward passage thereof to the outlet flue. Furthermore, the area of the tangential inlet opening 17 should be properly proportioned with respect to the above-mentioned ring-shaped space so as not to cause sharp increase or decrease in the gas velocity. For best results we have found that the area of opening 17 should be between one-half and one times the ring-shaped area between the circumference of the bottom end of the outlet cone and the circumference of the upper end of the vortical chamber. Also, we find it desirable to make the height of the opening 17 considerably greater than its width, in order that the gas shall be delivered therethrough in a stream whose thickness somewhat approximates the thickness to which it is confined at the start of its downward vortical motion. Good results have been obtained, for example, with an opening whose height is about 5 times its width.

The diameter of the dust outlet opening 13 at the bottom of the lower cone should be from one-fourth to three-eighths of the largest diameter of the vortical chamber. If said opening is too large it permits too large a proportion of the gas to pass therethrough into the dust bin, while if said opening is too small the flow of gas therethrough becomes insufficient to sweep all of the separated material through this opening and keep the walls of the chamber clean, which is essential to good operation.

In the particular form of separating element above described the height of the bottom cone 12 is advantageously about half as great as that of the cylindrical portion 11, the height of the cylindrical portion being, for example, from 2½ to 5 times the diameter thereof, and preferably about 3 or 3½ times, and the height of the cone being between 1 and 2 times said diameter, and preferably about 1½ times. One particular type of separating element which has been found to give good results comprises a cylindrical portion 6 inches in diameter and 18 inches long, with a bottom cone 9 inches long having a dust outlet at its lower end 2 inches in diameter. The tangential inlet opening is 1½ inches wide and 7½ inches high, while the gas outlet or upper cone is also 7½ inches high and is 3¼ inches in diameter at the throat and about 6 inches in diameter at the top. The height of the entrance chamber, including the shoulder 18, is about 9½ inches.

Figure 6:
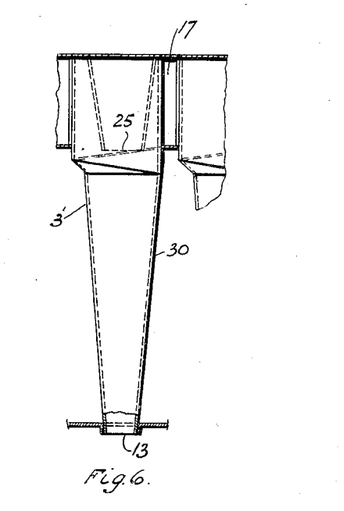
Fig. 6 is a side elevation of a modified form of vertical separating element.

A modified form of separating element 3' is shown in Fig. 6, which is substantially the same as above described with the exception that the walls of the vortical separating chamber are formed by an elongated frustrum of a cone, indicated at 30, which slopes gradually inwardly from the top to the bottom of said chamber. The general rules above given as to the proportions of height of separating chamber to the diameter at the upper end thereof, and as to the relative sizes of the dust outlet 13 and the gas outlet throat 25, also applies to this form of separating element. Elements of this form may be assembled in the same manner as the elements 3 above described. We prefer, however, to make the vortical separating chamber, as shown in Figs. 1 to 5, of substantially uniform diameter throughout the major portion of its length, with a relatively short frusto-conical portion at its lower end, terminating in the restricted outlet, as such construction enables the vortical separating action hereinafter described to be more effectively performed.

Any suitable means may be used for delivering the dust laden gas to the separating apparatus and for causing the desired velocity of gas flow therethrough. For example, as shown in Fig. 7 such gas may be delivered through flue 32 to a fan or blower 33 whence it may be delivered through flue 34 to the inlet flue 4 of the separating apparatus at sufficient pressure to maintain the necessary gas velocity. The outlet flue 5 may be connected to a flue 35 for conducting the clean gas to any desired point. It will be understood, of course, that if desired the fan may be placed in the outlet flue, so as to maintain a sub-atmospheric pressure throughout the apparatus, or that any other suitable means may be employed for maintaining the necessary pressure drop across the apparatus.

In some cases it is desirable to provide for heating or cooling the walls of the vortical elements, and in such cases a casing 31 may be provided as shown in Fig. 7, surrounding the assemblage of vortical elements 3 and provided with inlet means 28 and outlet means 29, for conducting heating medium, such as hot gases, or cooling medium, in contact with the walls of elements 3.

In the operation of this form of the invention for the removal of dust from gases, the dirty gas is delivered through inlet flue 4 and the branches 4a thereof to the inlet openings 17 of the several separating elements, as indicated by the arrows in Fig. 5. Passing through said openings, such gas is deflected by the deflector plates 14 and is caused thereby, and by the outlet pipes 24 which also serve as deflectors, to pass downwardly with a rapid whirling motion into the vortical chambers of the respective elements 3. The rapid vortical motion of the gas and of the dust carried thereby causes the dust to be moved under the action of centrifugal force outwardly in this whirling gas stream toward the wall of the chamber. This action results in a concentration of the dust particles in the outer portions of this whirling gas stream and finally in the formation of a relatively thin layer or film against the wall of the tube, containing substantially all of the dust, said dust film being carried along around the tube and downwardly therein due to the frictional or sweeping action of the gas and with a force much greater than the force of gravity but at a considerably lower rate of movement than the gas itself. Simultaneously with this action there is also a gradual inward passage of the inner portions of this downwardly moving gaseous vortex, toward the center of the tube and into an upwardly moving vortex. The portions of the gas which are furthest removed from the walls of the tube and are hence freest from suspended matter are thus gradually separated from the rest of the gas stream and directed upwardly toward the outlet opening 25, while still retaining their whirling motion. In this connection it is an important feature of our invention that the vertical length of the cylindrical portion 11 is several times the diameter thereof and is in general sufficient so that the inward movement of the gas toward the ascending vortex takes place over a relatively large area and is therefore so gradual as to interfere but little or not at all with the outward movement of the dust particles. This length is also sufficient to permit the centrifugal force to act on the dust particles for a sufficient length of time to move substantially all of said particles out of the main gas stream and into the above mentioned film or layer in contact with the wall.

Upon entering the conical bottom portion 12, the gas stream is gradually squeezed or forced inwardly so as to cause a somewhat increased resistance to downward flow and consequently cause a further portion of the gas stream to be deflected upwardly while still retaining its whirling motion. It will be noted, however, that with the form of separating element shown in Fig. 2, before this intensified "squeezing" of the gas from the descending vortex into the ascending vortex, the dust particles have already been substantially removed therefrom, and are thus prevented from being carried by such gas into the ascending vortex. Furthermore, the further decrease in radius of movement of the gas at this point causes a further increase in the radial acceleration thereof, thus intensifying the centrifugal force at this point. With the form of separating element shown in Fig. 6, the gas is gradually "squeezed" inwardly from the descending vortex into the ascending vortex, throughout the height of the vortical chamber, but the slope of the wall is so gradual that this squeezing action is insufficient at any point to cause too rapid an inward movement of the gas. When the gas remaining in the descending vortex reaches the constricted dust outlet opening 13 it still has a rapid whirling motion and the centrifugal force is such as to cause a considerably higher pressure adjacent the periphery of said opening than at the center thereof, while at the same time preventing direct inward movement of the gas and causing a part of the gas to pass on through this opening and into the common dust bin or settling chamber. The whirling gas stream thus passing through the conical portion 12 and the restricted outlet opening 13 carries along with it the film of dust and causes such dust to be thrown out into the dust bin. Since the pressure in the gas thus entering the dust bin is higher than that at the center of the opening 13, gas will be gradually drawn from the dust bin upwardly through the central portion of said opening and into the ascending vortex, but the horizontal dimensions of the dust bin, in proportion to the amount of gas entering the same, are sufficient to so reduce the upward component of this outflowing gas as to substantially prevent carrying away of dust thereby and permit such dust to settle at the bottom of the dust bin, whence it may be removed continually or from time to time through the gate 21.

However, when a large number of elements are connected to a common dust bin there are apt to be variations in pressure at the bottom openings 13 of the several elements, so that there may be at times a tendency for an increased upward flow of gas through said openings in certain of said elements, with a resulting tendency to carrying away of suspended dust particles by such upwardly passing gas. A further important feature of our invention, therefore, is that any dust which may thus be caused to enter the ascending vortex is again thrown outwardly therefrom by centrifugal action and into the descending vortex, whence it is separated as before. In this connection also the relatively great length of the cylindrical portions 11 is essential in that it provides a sufficient time of travel of such dust particles in the ascending vortex, before reaching the throat 25 of the conical outlet pipe 24, to insure passage of all such dust beyond the periphery of said throat and into the descending vortex. The ascending vortex of relatively great height, compared to the size of the outlet throat, therefore acts as an effective "centrifugal trap" to prevent entrainment of dust from the dust bin to said throat, and this feature of our invention we consider as one of important factors in the successful operation of a number of elements connected in parallel to a common dust bin.

In further explanation of the above, it may be stated that even at the low velocity at which this gas is drawn from the enlarged collecting chamber up into the vortical chamber, there may be small amounts of material picked up thereby and carried back up into the vortical chamber. It will be noted, however, that in order for any such material to reach the gas outlet it must again pass entirely through the length of the vortical chamber. Inasmuch as the entire body of gas in the vortical chamber, including both the internal vortex and the external vortex, is whirling at relatively high velocity, such suspended particles will again be set in whirling motion by the gas in the internal vortex and will have sufficient centrifugal force to be thrown out from the internal vortex to the external vortex and thence again to the walls of the chamber. It will be seen, therefore, that the internal vortex acts as an effective centrifugal trap for preventing entrainment of dust from the enlarged collecting chamber to the gas outlet. In order that this action may occur it is essential that the gases be kept in rapid vortical motion throughout their passage through the vortical chamber, both while in the external and in the internal vortices, and that the linear distance from the constricted dust outlet to the central gas outlet be relatively great as compared to the radius of said gas outlet, and preferably at least 10 times this radius, so that substantially all suspended particles carried upwardly into the internal vortex will have ample opportunity to pass outwardly beyond the periphery of said gas outlet before reaching the same.

The fact that the forces acting on the dust particles, not only in throwing the same out of the gas stream against the walls of the vortical chamber, but also in moving them around and along the walls of said chamber and eventually through the dust outlet openings into the dust bin so as to prevent them from being picked up by the ascending vortex, and also the fact that the internal vortex acts as a centrifugal trap to prevent dust being carried thereby from the dust bin to the gas outlet, are clearly evidenced by the fact that the separating elements as above described, with a velocity of gas flow as provided above, have been operated in inverted position, that is, with the gas inlet and outlet at the bottom and the dust outlet at the top, and have been found to be practically as efficient in the removal of dust from gas in this inverted position as in the position shown in the drawings.

The apparatus may also be used advantageously for the transfer of heat from or to the gases passing therethrough. For example, if the gas is at a relatively high temperature and it is desired to cool the same, such gas may be passed through the apparatus, and a high rate of transfer of heat from the gas to the walls of the several vortical elements is effected because of the intimate contact of the rapidly moving relatively thin streams of gas with the walls of said elements. A particularly advantageous application of the apparatus for this purpose is in the combined cleaning and collecting of hot dust laden gases such as arise, for example, in many well known industrial operations. When such gases are passed through the apparatus not only is the dust separated completely from the gas, but also the temperature thereof is materially reduced, provided, of course, that the temperature of the air outside the separating elements is below that of the gases being treated. When used in this connection, a particular advantage of the apparatus is that the walls of the separating elements, through which the heat transfer from the gas to the outside air takes place, are at all times kept substantially clean and free from deposits of solid material which frequently build up in the tubes or other elements of heat transfer apparatus of other types, and which materially reduce the rate of heat transfer from the gas to the walls of such elements.

In some cases, particularly with gases having high relative humidity, it is advantageous to prevent cooling of such gas within the separating elements and resulting condensation of moisture therein which would tend to moisten or wet the separated solid particles and cause the same to stick together and also to the walls of the separating elements. This is particularly true with certain classes of solid materials, such as for example powdered milk, which has a great tendency to become sticky in the presence of even a small amount of condensed moisture. For this purpose suitable heating means may be provided for heating the apparatus, or for heating the gases passing therethrough. For example, a heating medium, such as a hot gas, may be passed through the casing 31 shown in Fig. 7 around the vortical elements 3 so as to maintain the same at the required temperature. In case it is desired to cool the gases being treated, a cooling medium or fluid may be passed through said casing.

Figure 8:
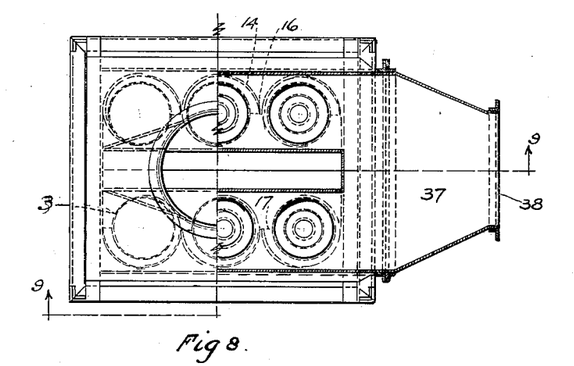
Fig. 8 is a partly sectional plan view of a modified form of apparatus, taken on line 8—8 in Fig. 9.
Figure 9:
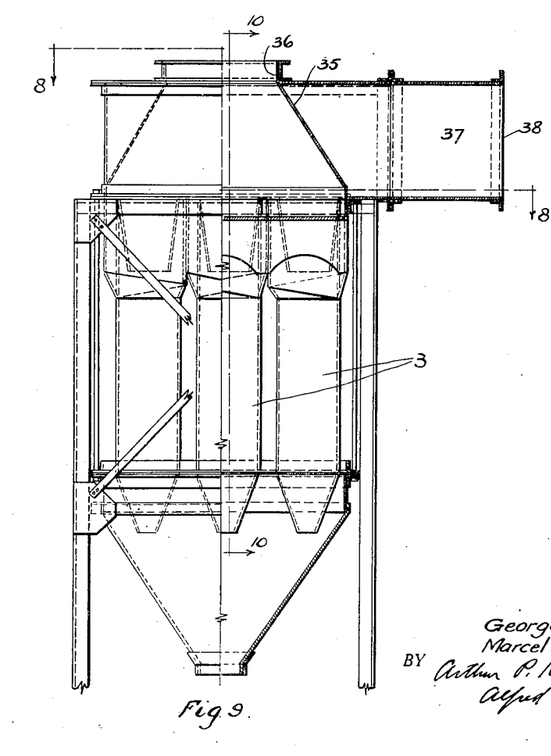
Fig. 9 is a partly sectional side elevation on line 9—9 in Fig. 8.
Figure 10:
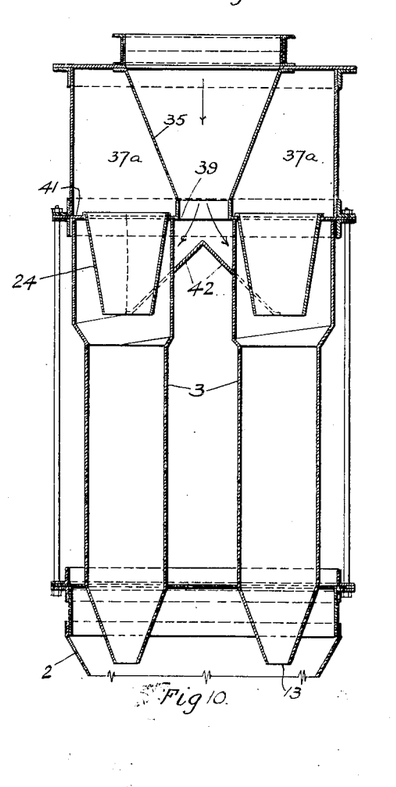
Fig. 10 is a transverse section of this form of apparatus taken on line 10—10 in Fig. 9.

A modified form of separating apparatus is shown in Figs. 8, 9 and 10. In this case a centrally disposed inlet flue 35 opens through the top of the apparatus at 36 while two outlet flue branches 37a extend alongside said inlet flue and communicate at one end with the main outlet flue connection 37 which has an opening 38 for connection to suitable means for conducting the gas away from the apparatus. The inlet flue 35 opens at 39 through the bottom plate 41 of the upper header, said opening being relatively long and narrow so that the incoming gas is delivered between the entrances of the several separating elements 3 which, as shown in Fig. 8, are arranged in two rows at opposite sides of said opening. Said separating elements are of substantially the same construction as above described and are mounted with their tangential inlet openings 17 opening inwardly toward the center of the apparatus. Downwardly and outwardly inclined deflector plates 42 constituting the bottom for the inlet header serve to guide the incoming gas downwardly and outwardly and deliver the same to the inlet openings of the respective separating elements. As in the other form of the invention the outer end 16 of the curved deflector plate 14 of each separating element is secured tightly to the deflector plate of the adjacent element so as to prevent outward leakage of gas between the respective elements.

As in the first described form of the invention, the dust outlet opening 13 at the lower ends of the several elements open into a common dust bin or settling chamber 2.

In the operation of this form of the invention the gas enters downwardly through inlet flue 35 and opening 39 and strikes the deflector plates 42 by which it is diverted into the inlet openings 17 of the several elements. The action of the gas in passing through the separating elements and the separation of the dust therefrom, together with the delivery of such dust into the common dust bin 2, and the outward passage of the gas upwardly through the conical outlet pipes 24, is substantially the same as above described. From said outlet pipes the gas enters the outlet flue branches 37a and is conducted thereby to the outlet flue 37. It is evident, therefore, that the principal distinction between this form of the invention and that first described is in the arrangement of the inlet and outlet flues for distributing the gas to the inlet openings of the several elements and for conducting the gas away from the gas outlet openings thereof.

Figure 11:
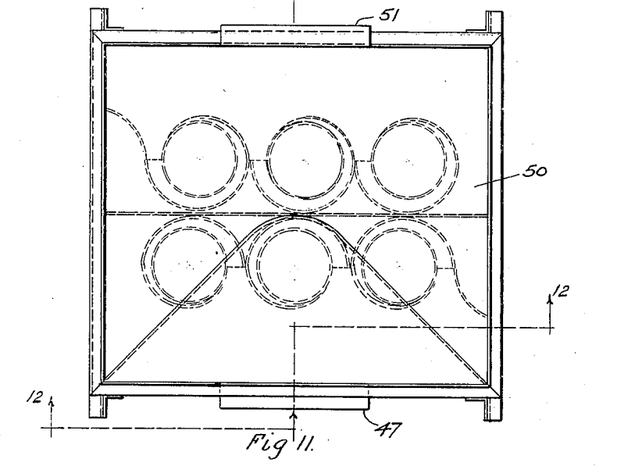
Fig. 11 is a plan view of another modification of the invention.
Figures 12, 13:
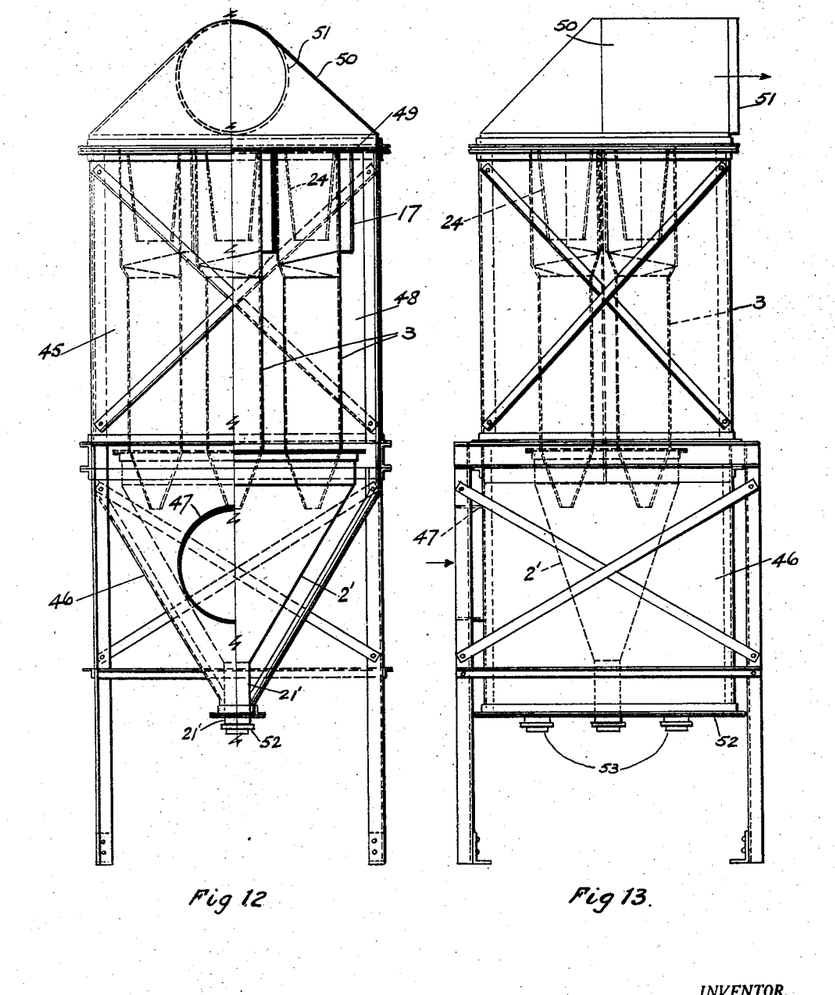
Fig. 12 is a partly sectional side elevation of this form of apparatus, on line 12—12 in Fig. 11.
Fig. 13 is an end view thereof.

Another possible modification which may advantageously be used in some cases, is illustrated in Figs. 11, 12 and 13. This form of apparatus comprises an outer housing 45 having a hopper-shaped bottom portion 46 provided with a gas inlet opening 47 at one end. The space 48 inside said housing is separated by a top plate 49 from the outlet flue 50 which has an outlet opening 51 at one side. The several separating elements 3 and the common dust bin or settling chamber 2' are in this case all mounted within the outer housing 45 and the hopper-shaped bottom 46 thereof. Said separating elements are secured directly beneath the top plate with the tangential inlet openings 17 thereof opening directly into the space 48, the frusto-conical outlet pipes 24 being also secured to plate 49 and depending within the inlet means of the respective separating elements in the same manner as above described. The gated dust discharge outlet 21' extends through the bottom plate 52 of the outer hopper 46. Said bottom plate 52 may also be provided with gated discharge spouts 53.

In this form of apparatus the space 48 serves not only as an inlet flue for distributing the incoming gas to the inlet openings of the several separating elements, but is also adapted to perform another important function. It has been found that in the removal of suspended material from gases having high relative humidity, as above referred to, the use of this form of apparatus is advantageous, for the incoming gases surround the separating elements and maintain said elements at all times at substantially the temperature of such incoming gases and thus prevent cooling of the gas inside the separating elements and resulting condensation of moisture on the walls and on the separated material which might tend to make the deposit adhere to the walls. Any dust settling out of the gas within the outer housing 45 and outside the separating elements and the dust bin 2' will collect at the bottom of hopper 46 and may be removed from time to time through the gated spouts 53.

We prefer, for practical reasons and particularly in order to facilitate removal of dust from the enlarged collecting or settling chamber, to mount the vortical chambers or tubes with their axes vertical as shown, and to provide the tangential gas inlet and central gas outlet at the upper end of each tube and the enlarged collecting chamber at the lower end thereof. However, our invention is not restricted to this arrangement, and insofar as the separation of dust in the vortical elements and the delivery of such dust therefrom into the enlarged chamber, the operation is practically the same regardless of whether the tubes are horizontal or vertical and no matter which end the gas inlet and outlet, and the dust collecting chamber, respectively, are located. The fact that the vortical chamber will operate satisfactorily with the gas inlet and outlet at the bottom of the enlarged collecting chamber at the top is conclusive proof that the suspended particles are separated from the gas stream and carried along and out of the vortical chamber into the enlarged collecting chamber by forces much greater than the force of gravity. It also furnishes evidence of the efficacy of the vortex at the dust outlet in throwing the dust out into the enlarged chamber (for it would otherwise be caused to fall by gravity back into the vortical chamber), and of the fact that the rapidly whirling internal vortex acts as an efficient centrifugal trap to prevent dust from the enlarged chamber passing back through the vortical chamber and reaching the gas outlet.

We claim:

1. An apparatus for treating gases comprising a plurality of vertically extending separating elements disposed in a row, each element comprising an elongated vortical chamber of circular cross-section, inlet means at the upper end of said vortical chamber adapted to deliver gas thereto with a vortical motion, a restricted outlet opening for separated material at its lower end and a centrally disposed gas outlet pipe at the upper end within said inlet means, the inlet means of each of said separating elements comprising a curved wall extending in spiral form throughout substantially a complete revolution and having its inner and outer ends spaced apart to provide a tangential inlet opening therebetween, said separating elements being disposed adjacent one another with the outer end of the spiral wall of each inlet means disposed substantially in juxtaposition to the spiral wall of the inlet means of an adjacent separating element, the tangential inlet openings of all of said inlet means being disposed toward the same side of the row of separating elements, and a common inlet header extending adjacent said inlet means and communicating with all of said tangential inlet openings, the portions of said spiral walls at the side of the inlet means toward said inlet header constituting part of the wall of said header and serving to direct gas from said header into said tangential inlet openings.

2. An apparatus for treating gases comprising a plurality of vortical separating elements arranged in a plurality of rows, each of said elements consisting of an elongated vertical tubular chamber of circular cross-section and provided with inlet means at its upper end having an inlet opening at the side thereof and adapted to deliver gas substantially tangentially into said chamber adjacent the outer wall thereof and a restricted outlet for separated material at the lower end of said chamber, an inlet header and an outlet header each extending adjacent the upper ends of said rows of separating elements, said inlet header communicating with the inlet openings of all of said separating elements, and gas outlet means for the respective separating elements, communicating with said outlet header, said inlet header having bottom wall portions sloping downwardly toward the inlet openings for all of said separating elements to direct gas from the inlet header into the respective inlet openings with a downward component of motion.

3. A construction as set forth in claim 2, in which the separating elements are arranged in two rows with the inlet openings of each row disposed toward the other row, and in which the said sloping bottom wall portions of the inlet header are located between the rows of vortical separating elements and the outlet header is provided with branches extending respectively at each side of the inlet header and communicating with the gas outlet means of the separating elements in the respective rows.

4. A construction as set forth in claim 2, in which the separating elements are arranged in two rows with the inlet openings of each row disposed away from the other row, and in which said gas outlet header extends directly over the rows of vortical chambers and the inlet header is provided with branches extending respectively at opposite sides of the outlet header and communicating respectively with the inlet openings of the separating elements in the respective rows.

5. An apparatus for treating gas, carrying suspended dust, comprising a group of separating chambers of unobstructed circular cross-section, each chamber having a separate gas inlet means at its upper end for introducing gas downwardly thereinto with a whirling motion, a separate centrally disposed gas outlet opening at its upper end, and a restricted central dust outlet opening at its lower end, the axial height of each chamber between said gas outlet and dust outlet openings being at least approximately three and one-half times the largest internal diameter of the chamber; means associated with said group of chambers for passing gas therethrough in parallel, from the gas inlet means to the gas outlet openings thereof, at sufficient velocity to cause the whirling motion of the gas to persist downwardly to and through said dust outlet openings; a common dust settling chamber communicating with the restricted dust outlet openings of all of said separating chambers, said settling chamber having a cross-sectional area larger than the combined cross-sectional area of said separating chambers and extending to a sufficient depth below said dust outlet openings to allow dust carried into said settling chamber by said gas to settle, and accumulate in the lower portion thereof at a position remote from said dust outlet openings; and means for discharging the accumulated dust from said settling chamber.

GEORGE H. HORNE.
MARCEL A. LISSMAN.